(12) United States Patent
Garcia

(10) Patent No.: US 10,252,660 B1
(45) Date of Patent: Apr. 9, 2019

(54) ATV RACK FOR A PICKUP TRUCK

(71) Applicant: Martin Garcia, Kaufman, TX (US)

(72) Inventor: Martin Garcia, Kaufman, TX (US)

( * ) Notice: Subject to any disclaimer, the term of this patent is extended or adjusted under 35 U.S.C. 154(b) by 0 days.

(21) Appl. No.: 15/479,815

(22) Filed: Apr. 5, 2017

Related U.S. Application Data

(60) Provisional application No. 62/319,944, filed on Apr. 8, 2016.

(51) Int. Cl.
| | | |
|---|---|---|
| *A01M 31/02* | (2006.01) | |
| *B60P 3/077* | (2006.01) | |
| *B60P 3/08* | (2006.01) | |
| *B60P 1/43* | (2006.01) | |
| *E06C 5/02* | (2006.01) | |
| *B60P 3/06* | (2006.01) | |

(52) U.S. Cl.
CPC ............. *B60P 3/077* (2013.01); *B60P 1/43* (2013.01); *B60P 3/06* (2013.01); *B60P 3/062* (2013.01); *B60P 3/08* (2013.01); *E06C 5/02* (2013.01)

(58) Field of Classification Search
CPC .... B60P 3/062; B60P 3/08; B60P 1/04; B60P 3/06

USPC ........ 224/402; 296/3; 410/26; 414/462, 480, 414/537, 538
See application file for complete search history.

(56) References Cited

U.S. PATENT DOCUMENTS

| | | | | |
|---|---|---|---|---|
| 5,924,835 | A * | 7/1999 | Ross ...................... | B60P 3/062 |
| | | | | 224/402 |
| 6,253,502 | B1 * | 7/2001 | Layton ................. | H01Q 1/3216 |
| | | | | 212/180 |
| 6,485,237 | B1 * | 11/2002 | Sandwith .................. | B60P 3/08 |
| | | | | 410/24 |
| 7,513,333 | B2 * | 4/2009 | Davis ....................... | E06C 5/02 |
| | | | | 182/115 |
| 2015/0224907 | A1 * | 8/2015 | Holmgren ................. | B60P 3/08 |
| | | | | 414/482 |

* cited by examiner

*Primary Examiner* — Gregory W Adams
(74) *Attorney, Agent, or Firm* — Kenneth L Tolar

(57) ABSTRACT

An ATV rack for a pickup truck includes a pair of triangular braces, each secured to the upper edge of a truck bed sidewall, near the cab rear wall. Mounted on the braces is a storage grate formed of a fixed, horizontal front section, positioned above the cab roof, and a pivotal rear section. A free edge of the rear section can be lowered to load ATVs onto the grate and then raised to a horizontal position to transport the ATVs. The rear section may also be secured in a vertical, upright position to form an observation deck, or can be collapsed onto the front section to allow the cargo bed to be used for storage.

15 Claims, 4 Drawing Sheets

ATV RACK FOR A PICKUP TRUCK

CROSS REFERENCE TO RELATED APPLICATIONS

This application is entitled to the benefit of provisional patent application No. 62/319,944 filed on Apr. 8, 2016, the specification of which is incorporated herein by reference.

BACKGROUND OF THE INVENTION

The present invention relates to a rack that allows a user to store multiple ATVs above a truck bed to avoid towing an ATV trailer.

DESCRIPTION OF THE PRIOR ART

If a camper or a hunter wishes to take both a travel trailer and an ATV to a destination, two vehicles must be used, each towing a designated trailer. Therefore, two drivers and additional fuel are required, which is burdensome and costly. Although one ATV can be stored in a pickup truck bed, it occupies valuable storage space that could otherwise be used for other items. Furthermore, if multiple ATV users are present, they must share a single vehicle, which is annoying.

Accordingly, there is currently a need for a means of transporting multiple ATVs in a pickup truck without using a trailer or occupying cargo space. The present invention addresses this need by providing a rack that is elevated above a truck bed for storing and transporting multiple ATVs.

SUMMARY OF THE INVENTION

The present invention relates to an ATV rack for a pickup truck comprising a pair of triangular braces, each secured to the upper edge of a truck bed sidewall, near the cab rear wall. Mounted on the braces is a storage grate formed of a fixed, horizontal front section, positioned above the cab roof, and a pivotal rear section. A free edge of the rear section can be lowered to load ATVs onto the grate and then raised to a horizontal position to transport the ATVs. The rear section may also be secured in a vertical, upright position to form an observation deck, or can be collapsed onto the front section to allow the cargo bed to be used for storage.

It is therefore an object of the present invention to provide a rack that allows multiple ATVs to be transported on a pickup truck.

It is therefore another object of the present invention to provide a rack that elevates multiple ATVs above a truck to allow other items to be stored and transported in the cargo bed.

Other objects, features, and advantages of the present invention will become readily apparent from the following detailed description of the preferred embodiment when considered with the attached drawings and the appended claims.

BRIEF DESCRIPTION OF THE DRAWINGS

FIG. 5 is a top, sectional view of the rack.

DESCRIPTION OF THE PREFERRED EMBODIMENT

Figure 1:
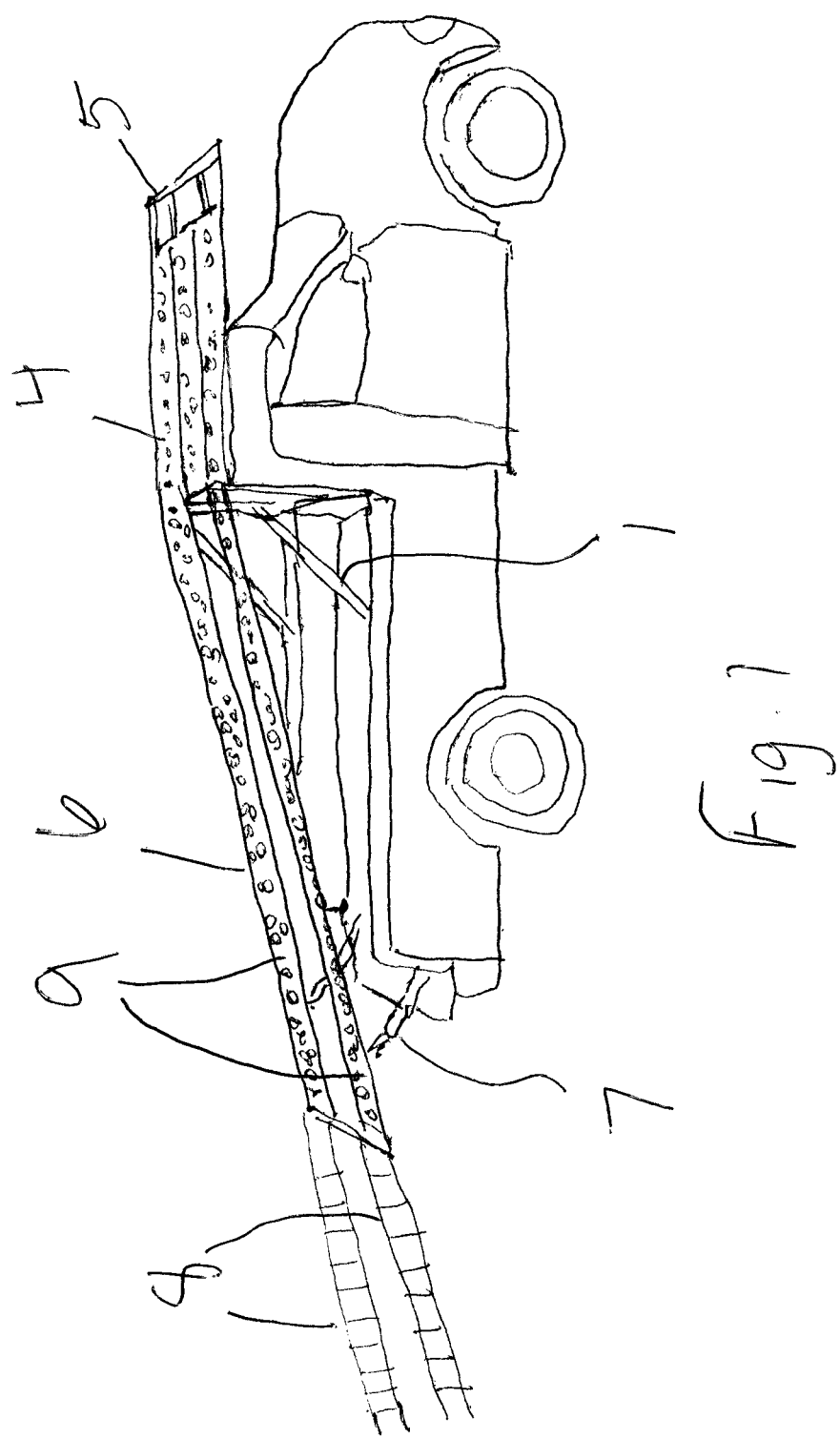
FIG. 1 is a perspective view of a pickup truck with the rack according to the present invention mounted thereon, and the rear section lowered.
Figure 2:
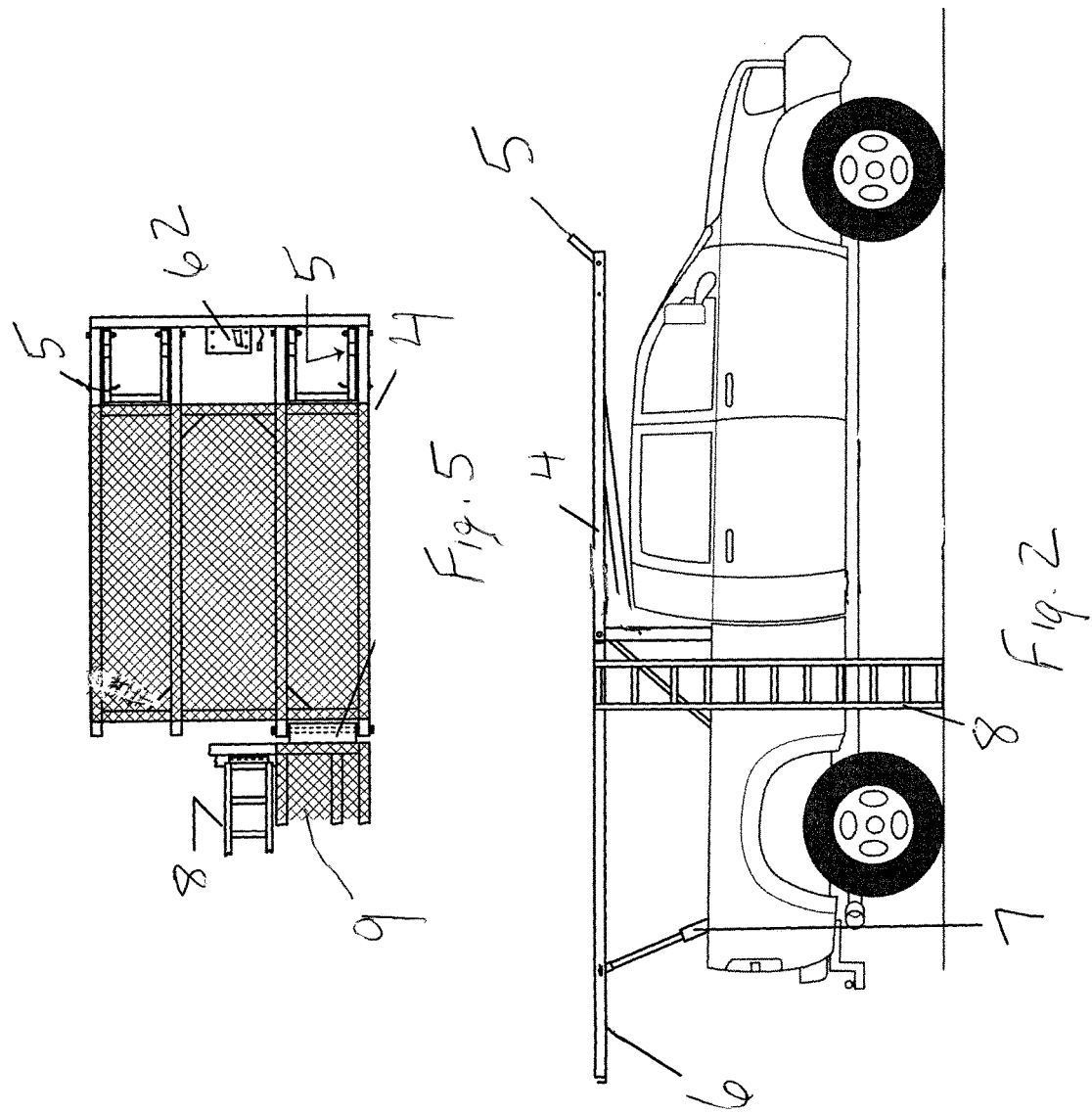
FIG. 2 is a side view of a pickup truck with the rack according to the present invention mounted thereon.

The present invention relates to an ATV rack for a pickup truck comprising a base structure formed of a pair of triangular braces 1, each secured to the upper edge of a truck bed sidewall 2, near a rear wall of the cab 3. Extending from one brace to the other is a horizontal support beam having a storage grate mounted thereon. The storage grate includes a fixed, horizontal front section 4 that extends above and is parallel to the cab roof. Pivotally attached to a forward edge are a pair of rectangular chock frames 5 for engaging wheels on a forward-most ATV. The wheel chocks can be locked in a collapsed position using locking pins or similar fasteners.

Hingedly attached to a back end of the front section is a rear section 6 having a free distal edge that extends beyond the truck tailgate. The rear section is formed of a pair of spaced, mesh tracks 9 on which ATV wheels rest when stored. Pivotally attached to the truck bed are a pair of hydraulic cylinders 7 that are removably connected to the rear section 6 to raise and lower it between a raised, horizontal and a lowered, oblique position. The pneumatic cylinders are controlled with a remote unit 20 that operates a hydraulic pump 50 mounted on a plate 62 on the front rack. A motorized winch 51 positioned on the plate 62 is operated with a remote unit 55 to lift the rear section beyond the reach of the pneumatic cylinders as described in more detail below.

The rack further comprises a pair of ladders 8 that can be secured to the free edge of the rear rack to provide loading ramps for an ATV, or which can be used independently to access various areas of the storage grate. When not in use, the ladders are securable between the spaced tracks 9 using locking pins or similar fasteners.

Figure 3:
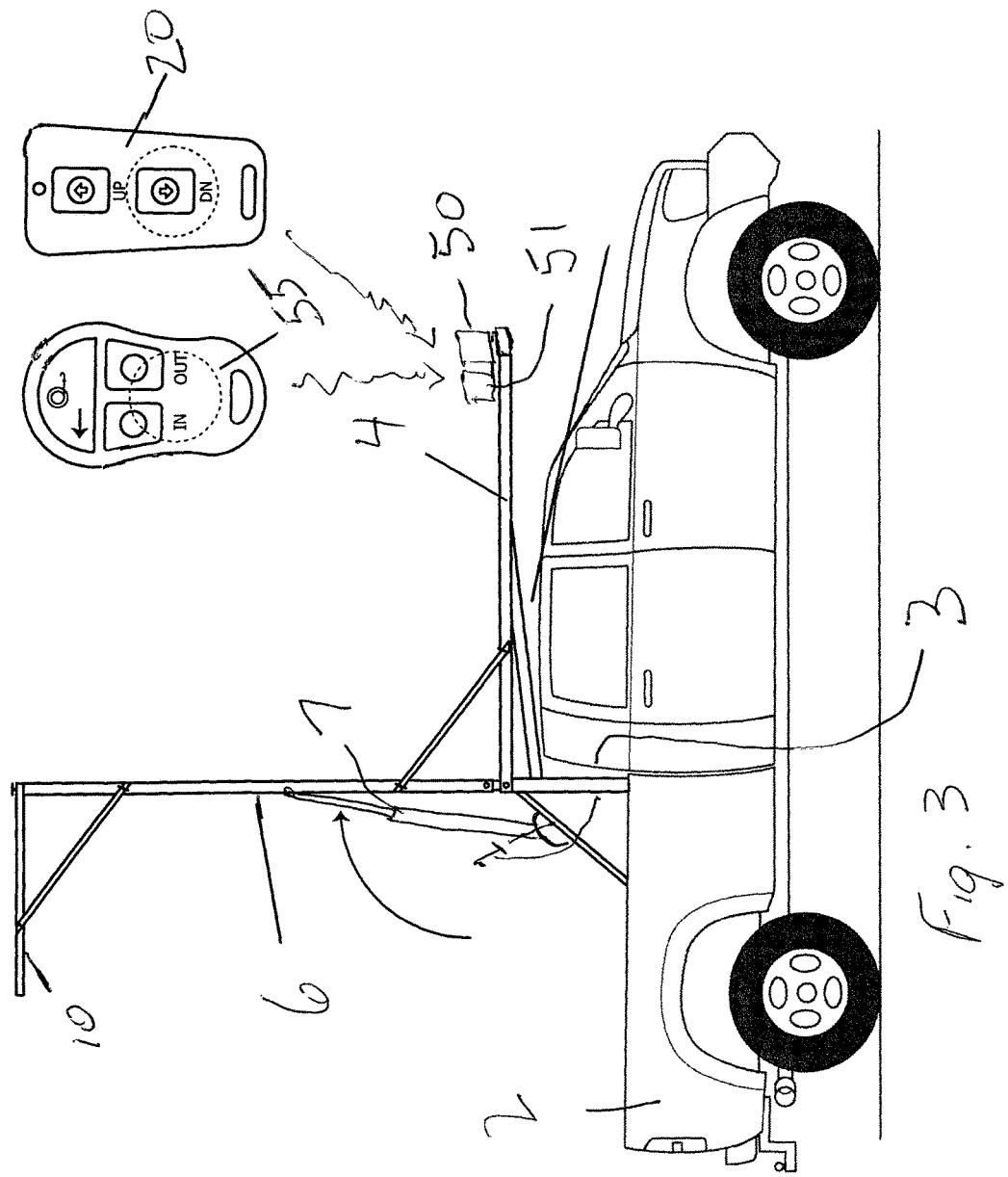
FIG. 3 depicts the rack of FIG. 2 with the rear grate section in a vertical, upright position to form a hunting stand or observation deck.
Figure 4:
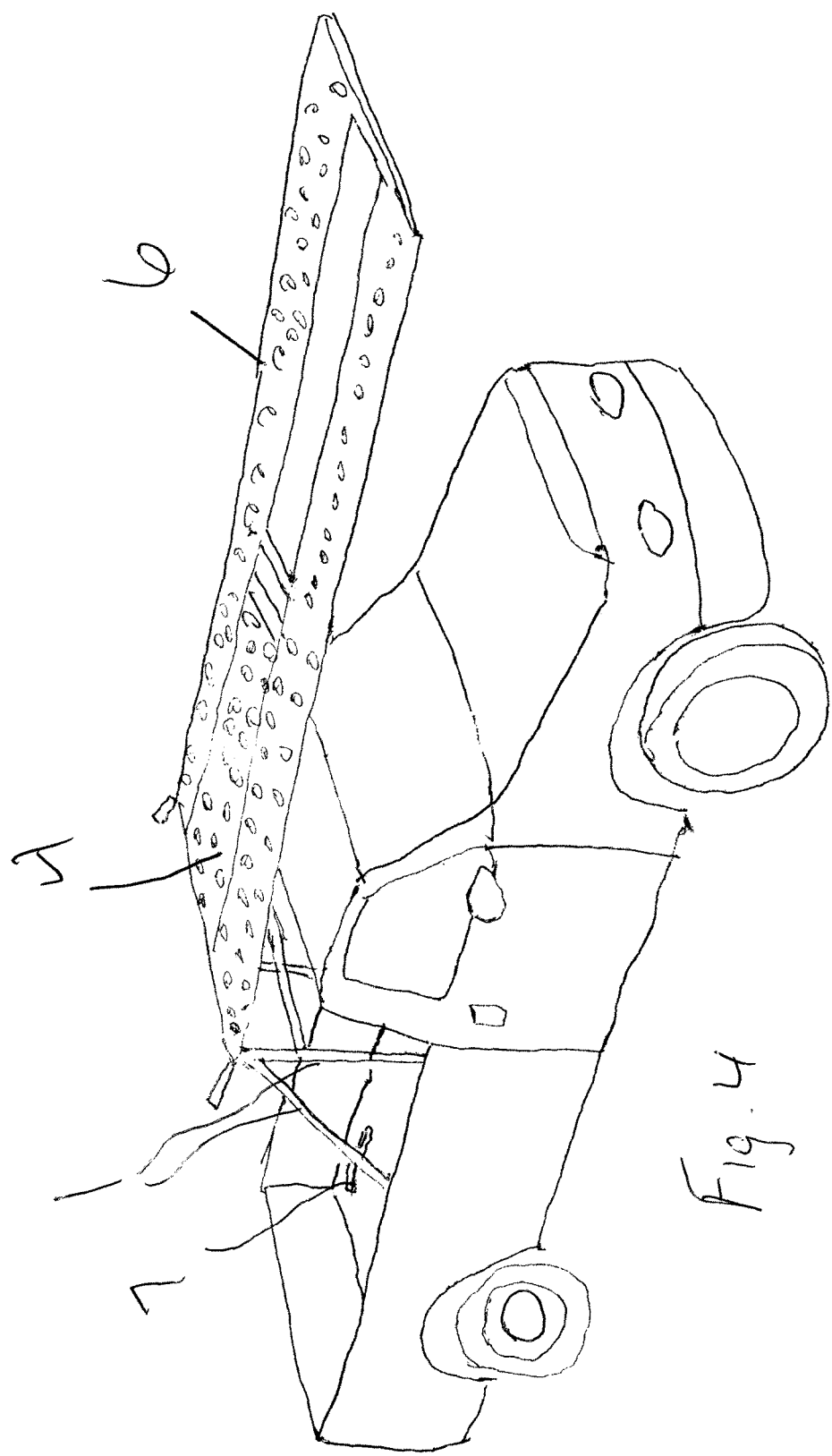
FIG. 4 is a perspective view of the pickup truck with the rear section collapsed onto the front section.

Accordingly, the rear section is lowered to an oblique position and the ladders are secured thereto, extending to ground level, to load ATVs onto the front and rear sections. Once the ATVs are loaded, the rear section can be raised to a horizontal position to transport the ATVs. Furthermore, a user can fix a ladder 8 at the front of the bed, between the spaced tracks, extend the winch cable over an elevated rung, detach the cylinders and secure it to the rear section to lift the rear section to a vertical, upright position as depicted in FIG. 3. Then, a platform 10 can be secured at a desired height along the upright section with locking pins to create a hunting stand, an observation deck, etc. The other ladder can then be used to provide access to the platform. Alternatively, the hydraulic cylinders can be secured to the truck bed and rear rack with removable locking pins. Therefore, a user can secure the lower end of each cylinder to one of the triangular braces 1 and the upper end to the rear rack to lift the rear section to a vertical, upright position as depicted in FIG. 3. The rear section may also be collapsed onto the front section to allow the truck bed to be used for storage as depicted in FIG. 4.

The above-described device is not limited to the exact details of construction and enumeration of parts provided herein. For example, though the device has been primarily depicted and described as storing and transporting ATVs, the device could also transport other small vehicles, as well as various tools, equipment and miscellaneous supplies. Furthermore, the size, shape and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. For a pickup truck having a cab with a rear wall and a roof, and a bed having a floor, a pair of spaced sidewalls and a rear tailgate, a storage rack comprising:
    a support structure including a pair of triangular braces, each of said braces secured to an upper edge of one of said sidewalls;
    a horizontal front section attached to said support structure and suspended above said roof, said front section having a front edge and a rear edge;
    a rear section pivotally attached to the rear edge of said front section, said rear section including a front edge and a rear edge;
    at least one automated lifting cylinder removably securable within the floor of said bed and attached to the rear edge of the rear section for pivoting said rear section between a lowered position wherein said frame extends obliquely from the rear wall of said cab, a vertical upright position parallel to the rear wall of said cab, and an inverted position superimposed on and parallel to said roof and said front section, wherein said automated lifting cylinder is securable to either of said braces to facilitate pivoting said rear section to the vertical upright position;
    a platform perpendicularly attachable to said rear section to convert said rack to an observation deck when said rear section is in the vertical upright position.

2. The storage rack according to claim 1 further comprising a pair of chock frames pivotally attached to the front edge of the front section to prevent vehicle wheels from rolling.

3. The storage rack according to claim 1 further comprising a loading ramp attachable to the rear edge of said rear section to facilitate loading of rolling cargo onto said front section and said rear section.

4. The storage rack according to claim 1 wherein said rear section includes a pair of spaced, mesh tracks on which vehicle wheels rest when stored.

5. The storage rack according to claim 3 wherein said loading ramp is a pair of ladders that are removably attachable to the rear edge of said rear section.

6. The storage rack according to claim 5 wherein each of said ladders is removably securable between said spaced mesh tracks for supporting a winch cable to lift said rear section to the vertical upright position.

7. The storage rack according to claim 1 further comprising a winch positioned within said bed, said winch having a cable attached to the rear edge of said rear section for raising the rear section beyond a maximum extension range of said lifting cylinder.

8. The storage rack according to claim 1 further comprising a remote unit for automatically extending and retracting said automated lifting cylinder.

9. For a pickup truck having a cab with a rear wall and a roof, and a bed having a floor, a pair of spaced sidewalls and a rear tailgate, a storage rack comprising:
    a support structure mounted on said sidewalls;
    a horizontal front section attached to said support structure and suspended above said roof, said front section having a front edge and a rear edge;
    a rear section pivotally attached to the rear edge of said front section, said rear section including a front edge, a rear edge and a pair of spaced, mesh tracks on which vehicle wheels rest when stored;
    means for pivoting said rear section between a lowered position wherein said frame extends obliquely from the rear wall of said cab, a vertical upright position parallel to the rear wall of said cab, and an inverted position superimposed on and parallel to said roof and said front section;
    a platform perpendicularly attachable to said rear section to convert said rack to an observation deck when said rear section is in the vertical upright position;
    a loading ramp attachable to the rear edge of said rear section to facilitate loading of rolling cargo onto said front section and said rear section, wherein said loading ramp is a pair of ladders that are removably attachable to the rear edge of said rear section, each of said ladders removably securable between said spaced mesh tracks for supporting a winch cable to lift said rear section to the vertical upright position.

10. The storage rack according to claim 9 further comprising a pair of chock frames pivotally attached to the front edge of the front section to prevent vehicle wheels from rolling.

11. The storage rack according to claim 9 wherein said means for pivoting said rear section between a lowered position wherein said frame extends obliquely from the rear wall of said cab, a vertical upright position parallel to the rear wall of said cab, and an inverted position superimposed on and parallel to said roof and said front section comprises at least one automated lifting cylinder removably secureable within the floor of said bed and attached to the rear edge of the rear section.

12. The storage rack according to claim 11 wherein said support structure is a pair of triangular braces, each of said braces secured to an upper edge of one of said sidewalls.

13. The storage rack according to claim 12 wherein said automated lifting cylinder is securable to either of said braces to facilitate pivoting said rear section to the vertical upright position.

14. The storage rack according to claim 9 further comprising a winch positioned within said bed, said winch having a cable attached to the rear edge of said rear section for raising the rear section beyond a maximum extension range of said lifting cylinder.

15. The storage rack according to claim 11 wherein said means pivoting said rear section between a lowered position wherein said frame extends obliquely from the rear wall of said cab, a vertical upright position parallel to the rear wall of said cab, and an inverted position superimposed on and parallel to said roof and said front section further comprises a remote unit for automatically extending and retracting said automated lifting cylinder.

* * * * *